(12) United States Patent
Tamanoi et al.

(10) Patent No.: US 6,180,268 B1
(45) Date of Patent: Jan. 30, 2001

(54) MAGNETO-OPTICAL RECORDING MEDIUM

(75) Inventors: Ken Tamanoi; Masakazu Taguchi, both of Kanagawa (JP)

(73) Assignee: Fujitsu Limited, Kawasaki (JP)

( * ) Notice: Under 35 U.S.C. 154(b), the term of this patent shall be extended for 0 days.

(21) Appl. No.: 09/042,916

(22) Filed: Mar. 17, 1998

(30) Foreign Application Priority Data

Oct. 1, 1997 (JP) .................................................... 9-268265

(51) Int. Cl.[7] .................................................... G11B 5/60
(52) U.S. Cl. .................... 428/694 ML; 428/694 MM; 428/694 EC; 428/694 RE; 428/900; 369/13; 369/283
(58) Field of Search .................. 428/694 ML, 694 MM, 428/694 EC, 694 RE, 900; 369/13, 283

(56) References Cited

U.S. PATENT DOCUMENTS

| | | | |
|---|---|---|---|
| 4,842,956 | * 6/1989 | Kobayasho | 428/611 |
| 5,635,296 | * 6/1997 | Nokuyowe | 428/332 |
| 5,962,126 | * 10/1999 | Mieole | 428/332 |

FOREIGN PATENT DOCUMENTS

| | | |
|---|---|---|
| 1143041 | 6/1989 | (JP) . |
| 393058 | 4/1991 | (JP) . |
| 4271039 | 9/1992 | (JP) . |
| 7244877 | 9/1995 | (JP) . |
| 8276672 | 10/1996 | (JP) . |

* cited by examiner

Primary Examiner—Leszek Kiliman
(74) Attorney, Agent, or Firm—Greer, Burns & Crain, Ltd.

(57) ABSTRACT

An auxiliary magnetic layer for generating a reproduction magnetic field which can be positive or negative in accordance with the front and rear edges of a reproduction waveform is provided on the opposite side of the magnetic layer to the substrate for recording and reproducing data. Consequently, a magnetic field which has an advantageous polarity to each of the front and rear edges of the reproduction waveform functions and both edges can have steep inclinations, which enhances the quality of the reproduction signal.

15 Claims, 17 Drawing Sheets

MAGNETO-OPTICAL RECORDING MEDIUM

BACKGROUND OF THE INVENTION

The present invention relates to a magneto-optic recording medium and more specifically to a magneto-optic recording medium which can perform Magnetically Induced Super Resolution (MSR) reproduction.

Magneto-optic disks are known as a high-density recording medium and are expected to have a higher-density recording capacity in response to an increase in the amount of data. Higher density can be realized by shortening the intervals of the recording signals (marks), but the recording and the reproduction are restricted by the size (spot diameter) of the light beam on the medium. In order to reproduce a small mark whose period is equal to or smaller than the spot diameter, the spot diameter can be reduced. However, this reduction is restricted by the wavelength λ of the light source and the numerical aperture NA of the object lens. Consequently, it has been difficult to reproduce a recording mark which is more minute than the resolution of the optical system.

Recently, magnetically induced super resolution (MSR) media which can bring about the same effects as reducing the spot diameter by making a multi-layered recording medium and utilizing the temperature distribution of a medium formed in a beam spot have been suggested (Japanese Patent Application Laid-Open Nos. 1-143041 (1989), 3-93058 (1991), 4-271039 (1992), and others).

The MSR medium suggested in Japanese Patent Application Laid-Open No. 1-143041 (1989) can reproduce a mark smaller than the spot diameter without providing an initializing magnet, by applying a magnetic field of about several hundred Oe on reproducing. However, the detection area is too large to reduce the truck pitch, so that it is disadvantage to a densification in the direction of a disk radius. The MSR medium suggested in Japanese Patent Application Laid-Open No. 3-93058 (1991) requires an additional initializing magnet of about 3.4 to 4 kOe, and has a problem that the detection area is enlarged in accordance with an increase in the power of the reproduction beam, although it has a smaller detection area than Japanese Patent Application Laid-Open No. 1-143041 (1989). The provision of a magnet of several kOe makes it difficult to reduce the size of the recording/reproducing device. The MSR medium suggested in Japanese Patent Application Laid-Open No. 4-271039 (1992) has a small detection area regardless of the power of the reproduction beam, and can reproduce a mark recorded with a high resolution in the direction of the disk radius. However, there is a problem that an initializing magnet of several kOe is needed in addition to a reproduction magnetic field of several hundred Oe.

In order to solve these problems, the applicant of the present application has suggested a magnet-optic medium in Japanese Patent Application Laid-Open No. 7-244877 (1995) which can realize MSR reproduction by a RAD double mask method, by applying a reproduction magnetic field as low as several hundred Oe, without using an initializing magnet. FIG. 1 shows the magnetized condition of the reproduction of the MSR medium which has been disclosed by the applicant of the present application, and a film structure. As shown in FIG. 1, a magneto-optic disk 3 comprises a reproduction layer 33, a control layer 34, and a recording layer 35 accumulated in this order on a substrate (not shown). The reproduction layer 33 is a transition metal magnetization dominant film and has an easy axis of magnetization in the perpendicular direction, that is, the direction in which the layers are deposited. The control layer 34 is a rare-earth magnetization dominant film and has an easy axis of magnetization in the in-plane direction at room temperature (10° C. to 35° C.). The easy axis of magnetization changes from the in-plane direction to the perpendicular direction when the temperature reaches a predetermined temperature higher than the room temperature. The recording layer 35 is a transition metal magnetization dominant film and has an easy axis of magnetization in the perpendicular direction.

The magneto-optic disk 3 having such a structure is provided with a mark which is recorded in the downward direction, and when this mark is reproduced, a reproduction laser beam is irradiated while a reproduction magnetic field is being applied. The magnet-optic disk 3 generates a temperature distribution in the laser spot S, and the magnetization direction of the recording layer 35 is masked in a high temperature area (front mask) and a low temperature area (rear mask), and the mark is read from an intermediate temperature area (opening). FIG. 1 shows the case where the reproduction magnetic field is applied in the upward direction, that is, the direction for erasing data. Such a film structure and a reproducing principle of the MSR medium are detailed in Japanese Patent Application Laid-Open No. 7-244877 (1995) and Japanese Patent Application No. 8-276672 (1996), so that their description will be omitted.

According to the MSR medium which forms a mask in the beam spot S, the beam spot S has a slightly different mask formation area depending on the direction in which the magnetic field is applied in order to reproduce. Such a difference in the mask formation area makes the edges before and after the waveform of the reproduction signal (reproduction waveform) have different inclination from each other. FIGS. 2A and 2B show the waveforms of the reproduction signals which are obtained by applying magnetic fields in the erasing direction and in the recording direction on the magneto-optic disk 3 obtained by the applicant of the present application.

As shown in FIG. 2A, when reproduction is performed by applying the magnetic field on the MSR medium in the erasing direction, the inclination of the front edge of the reproduction waveform is less steep than that of the rear edge, so that the front edge has a larger jitter than that of the rear edge against the same strength of noise power. Consequently, the quality of the reproduction signal is affected by the jitter of the front edge. On the other hand, as shown in FIG. 2B, when reproduction is performed by applying the magnetic field on the MSR medium in the recording direction, the inclination of the rear edge of the reproduction waveform is less steep than that of the front edge, so that the quality of the reproduction signal is affected by the jitter of the rear edge. In either case, the reproduction waveform has nonlinearity, and the edge on the side where the magnetization direction of the reproduction layer accords with the erasing direction is more steep. Since the jitter increases on the side where the edge is less steep, it is difficult to perform correct detection of reproduction data.

In order to solve this problem, the applicant of the present invention has disclosed a method of detecting the timing of an edge of a reproduction waveform based on the obtained reproduction signal and then reversing (modulating) the reproduction magnetic field after the detection of the edge. According to this reproduction method, when the front edge and the rear edge of the recording mark are outputted, the magnetic field in the direction of the steeper edge can be applied, so that both edges of the reproduction waveform can be closer to be symmetrical. However, this method has a problem that the strength of the magnetic field is insufficient when the modulation frequency of the reproduction magnetic field is high. FIG. 3 is a graph showing the relationship between the frequency of the applied magnetic field and the intensity of the magnetic field according to the reproduction method disclosed by the applicant of the present invention. The ordinate axis indicates the intensity of the magnetic field and the abscissa axis indicates time. As shown in this graph, when the modulation frequency of the reproduction magnetic field is higher, the intensity of the magnetic field is low. There has been a problem that when the intensity of the magnetic field is low, it is hard to detect the reproduction signal correctly. Furthermore, it is necessary for a device for executing this reproduction method to provide an additional driving circuit for modulating the reproduction magnetic field.

BRIEF SUMMARY OF THE INVENTION

The present invention has been achieved in order to solve the aforementioned problems, and has an object of providing a magneto-optic medium which can obtain a high-quality reproduction signal, by making the inclinations of the edges before and after the reproduction waveform more steep and closer to be symmetrical, by providing an auxiliary magnetic layer which generate reproduction magnetic fields each having positive or negative polarity according to the edges before or after the reproduction waveform, without providing an additional circuit for the modulation of the magnetic field, and without making the intensity of the magnetic field insufficient.

The magneto-optic recording medium of the present invention is characterized by comprising: a magnetic layer for recording and reproducing data; and a magnetic field generation layer for generating two magnetic fields having reverse polarities, the magnetic field generation layer being formed by a magnetic film and situated on one surface of said magnetic layer.

Consequently, magnetic fields each having a reverse polarity from the other are generated, and the magnetic layers can be provided with a reproduction magnetic field having an advantageous polarity according to the front and rear edges of the reproduction waveform. As a result, there is no need of providing an additional circuit for reversing the polarity of the external magnetic field, which makes it possible to obtain a reproduction waveform which has front and rear edges whose inclinations are both steep.

Furthermore, the magneto-optic recording medium of the present invention is characterized by comprising: first, second, and third magnetic layers for recording and reproducing data for generating a temperature distribution in the magneto-optic recording medium due to the irradiation of a light beam which relatively moves with the first, second, and third magnetic layers and for reading data from an area determined by the temperature distribution in the magneto-optic recording medium; and a magnetic field generation layer for generating simultaneously two magnetic fields having reverse polarities, the magnetic field generation layer being formed by a magnetic film and situated on the opposite side of the third magnetic layer to the second magnetic layer.

Furthermore, the magneto-optic recording medium of the present invention is characterized by comprising: first, second, and third magnetic layers for recording and reproducing data for being made from a rare-earth/transition-metal alloy, the first and third magnetic layers having characteristics of easy magnetization in the direction of layer deposition and the second magnetic layer being rare-earth magnetization dominant and having characteristics of easy magnetization in the in-plane direction at room temperature; and a magnetic field generation layer for generating simultaneously two magnetic fields having the reverse polarities, the magnetic field generation layer being formed by a magnetic film and situated on the opposite side of the third magnetic layer to the second magnetic layer.

Consequently, the magnetization direction of the third magnetic layer is transcribed into the first magnetic layer and read out in the intermediate temperature area of the temperature distribution which is generated inside the beam spot as the result of the irradiation of the light beam. Consequently, magnetic fields, which have respective polarities and are generated by the magnetic field generation layer, are given to the low temperature area and the high temperature area between which the intermediate temperature area exists. As a result, reproduction magnetic fields having opposite polarities from each other can be given to each of the front and rear edges of a reproduction waveform.

Furthermore, the magneto-optic recording medium of the present invention is characterized by further comprising a non-magnetic layer between the magnetic layer and the magnetic field generation layer, and the magnetic field generation layer including a plurality of magnetic layers which have magnetically exchange coupled force at room temperature.

Thus, the non-magnetic layer disposed between the magnetic layer and the magnetic layer generation layer functions to eliminate the exchange coupled force between the magnetic field generation layers and the magnetic layers. Consequently, the magnetization directions of the plurality of magnetic layers in the magnetic field generation layers can be made to point to the same predetermined direction, regardless of the magnetization directions of the magnetic layers.

Furthermore, the magneto-optic recording medium of the present invention is characterized in that the magnetic field generation layer includes fourth, fifth, and sixth magnetic layers from the side closer to the third magnetic layer, and in that the coercive forces Hc1 to Hc6 of the first to sixth magnetic layers, respectively, and the Curie temperatures Tc1 to Tc6 of the first to sixth magnetic layers, respectively, satisfy following relations: $Hc6>Hc3>Hc5>Hc1$, $Hc4>Hc2$, and $Tc6>Tc4>Tc1>Tc3>Tc2>Tc5$.

Thus, the magnetic characteristics of the first, second, and third magnetic layers for recording and reproducing data and the fourth, fifth, and sixth magnetic layers for generating magnetic fields are specified. Consequently, when an external magnetic field is applied while a light beam is being irradiated to reproduce data, the magnetic direction of the fourth magnetic field is determined so as to generate two magnetic fields having the reverse polarities from each other, and also mask areas which prevent the magnetization direction of the third magnetic layer from being transcribed into the first magnetic layer are formed front and rear the read-out area which is determined by the temperature distribution inside the medium, and these mask areas are given the reverse polarities from each other.

Furthermore, the magneto-optic recording medium of the present invention is characterized in that the fourth magnetic layer is formed by a transition metal magnetization dominant rare-earth/transition-metal alloy film.

Furthermore, the magneto-optic recording medium of the present invention is characterized in that the fourth magnetic layer is formed by a rare-earth metal magnetization dominant rare-earth/transition-metal alloy film.

Consequently, when the fourth magnetic layer is transition metal magnetization dominant, it is possible to make the fourth and sixth magnetic layers have the same magnetization directions due to the exchange coupled force at the high temperature area. On the other hand, when the fourth magnetic layer is rare-earth magnetization dominant, it is possible to make the fourth and sixth magnetic layers have the opposite magnetization directions from each other due to the exchange coupled force at the high temperature area. When the magnetization directions of the fourth and the sixth magnetic layers are the same as that of the external magnetic field which is applied when data are reproduced, it is advantageous to the generation of a magnetostatic field, and the intensity of the external magnetic field can be reduced.

The above and further objects and features of the invention will more fully be apparent from the following detailed description with accompanying drawings.

DETAILED DESCRIPTION OF THE INVENTION

The present invention will be detailed based on the drawings which show the embodiments.

FIRST EMBODIMENT

Figure 1:
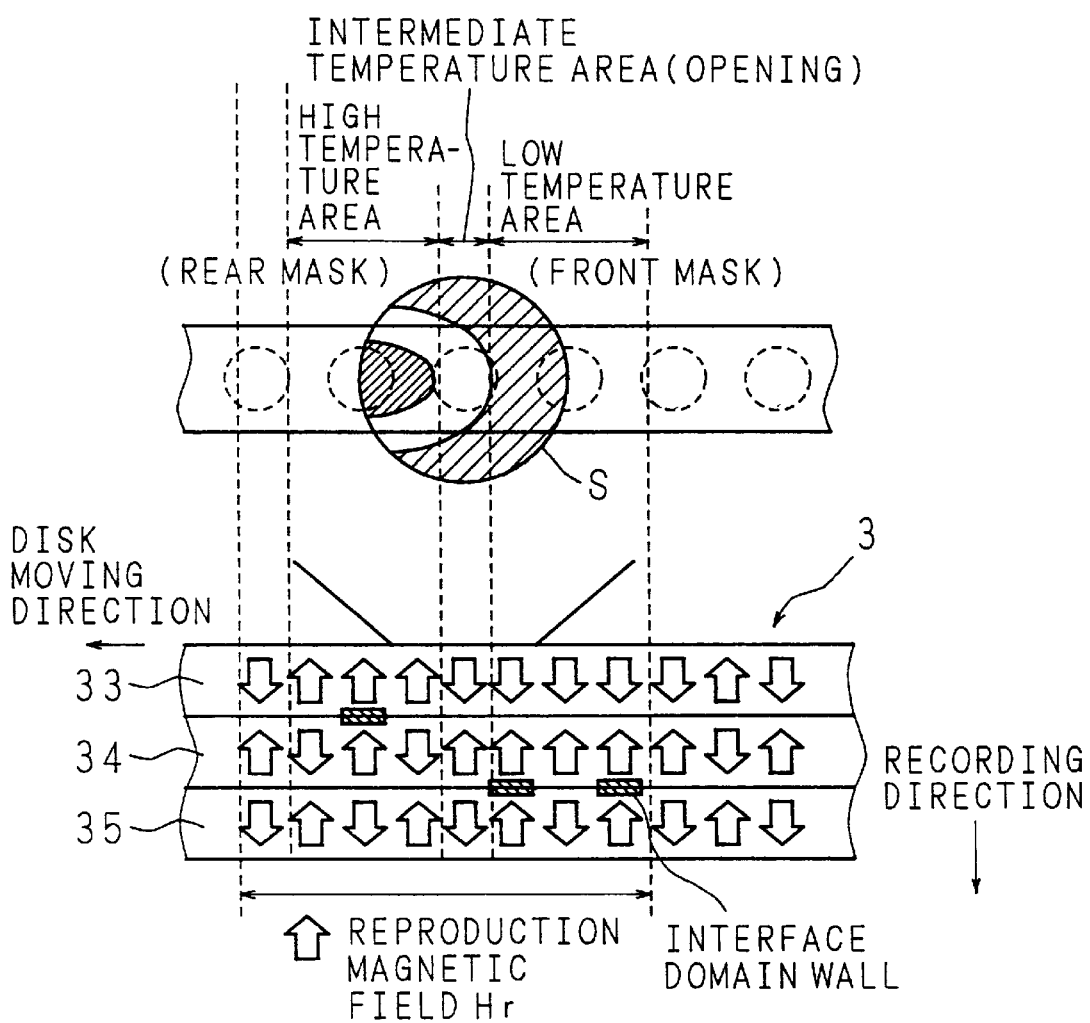
FIG. 1 shows the magnetized conditions when reproduction is performed by the MSR medium disclosed by the applicant of the present application.
Figure 2A:
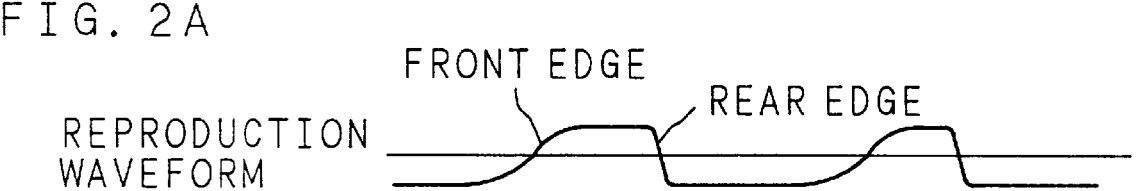
FIGS. 2A and 2B show the reproduction waveforms of the MSR medium of FIG. 1.
Figure 2B:
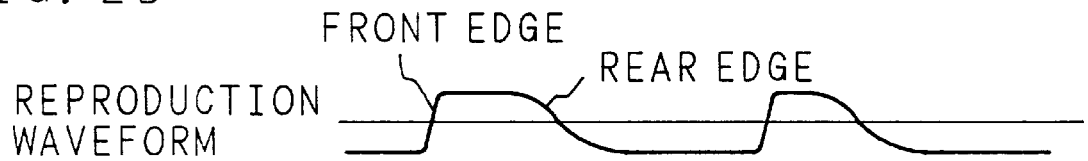
Figure 3:
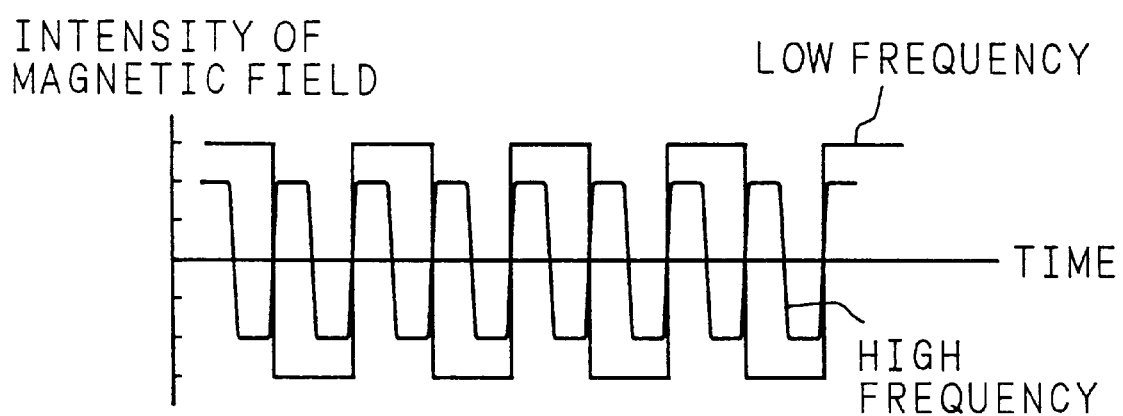
FIG. 3 shows a graph indicating the relationship between the frequency and the intensity of the magnetic field applied on the MSR medium.
Figure 4:
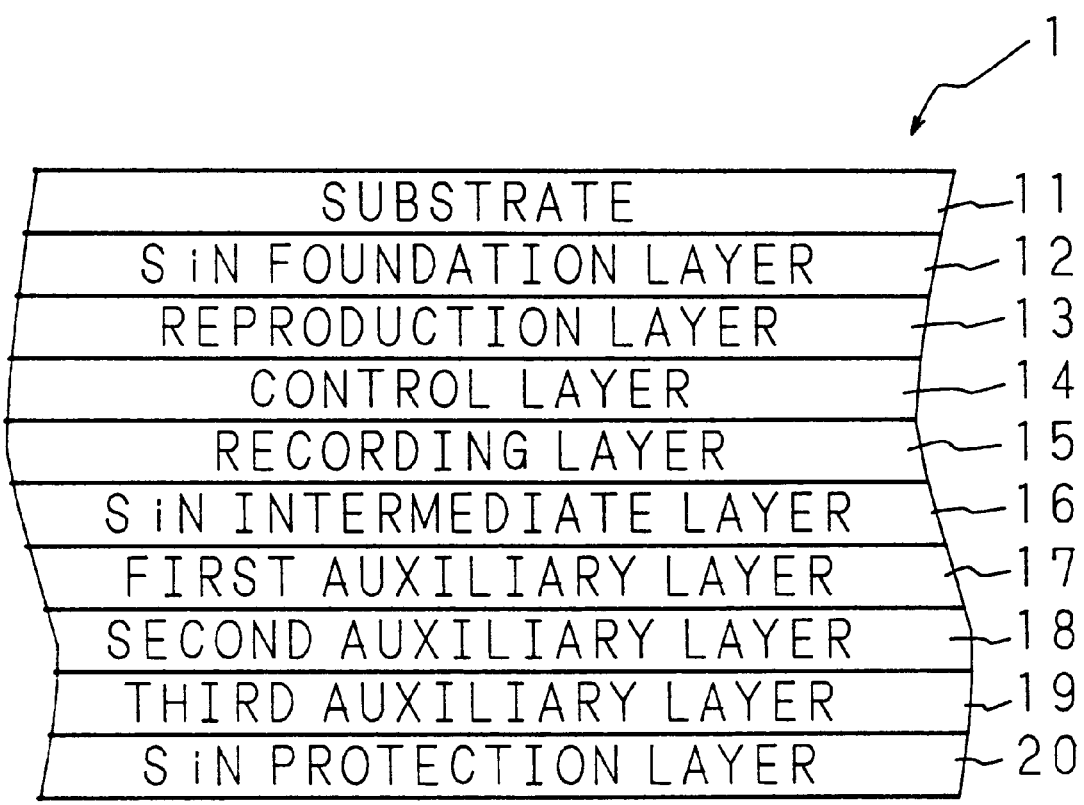
FIG. 4 shows the film structure of the magneto-optic disk of the present invention.

FIG. 4 shows the film structure of the magneto-optic disk of the present invention. As shown in FIG. 4, the magneto-optic disk 1 comprises a SiN foundation layer 12, a reproduction layer 13 a control layer 14, a recording layer 15, a SiN intermediate layer 16, a first auxiliary layer 17, a second auxiliary layer 18, a third auxiliary layer 19, and a SiN protection layer 20 which are accumulated in this order on a polycarbonate substrate 11. The first, second, and third auxiliary layers 17, 18, and 19, which are disposed on the opposite side of the recording layer 15 to the substrate with the SiN intermediate layer 16 therebetween, are the above-mentioned magnetic field generation layers for generating magnetostatic fields. Each of these layers which compose the magneto-optic disk 1 is formed by a DC spatter process in a vacuum chamber having a vacuum degree of $5 \times 10^{-5}$ Pa or below. Each SiN layer is formed under the conditions of a gas pressure of 0.3 Pa and a making power of 0.8 kW. The reproduction layer 13, the control layer 14, the recording layer 15, the first auxiliary layer 17, the second auxiliary layer 18, and the third auxiliary layer 19, which are magnetic layers, are formed under the conditions of a gas pressure of 0.5 Pa and a making power of 1.0 kW. The film composition, the film thickness, and the magnetic characteristics of each layer are shown in TABLE 1.

The control layer 14 is a rare-earth metal magnetization dominant (hereinafter RE-rich) in-plane magnetic film which does not have a compensation point until a Curie temperature, and the other magnetic layers are transition metal magnetization dominant (hereinafter TM-rich) perpendicular magnetic films. The relationship between the Curie temperature Tc and the coercive force Hc of each magnetic layer is as follows:

Tc6>TC4>Tc1>Tc3>Tc2>Tc5

Hc6>HC3>Hc5>Hc1, Hc4>Hc2

Here, Tc1 and Hc1 indicate the Curie temperature and the coercive force of the reproduction layer 13, and the numbers following each Tc and each Hc correspond to the orders (2, 3, 4, 5, and 6) of the magnetic layers on the side of closer to the substrate.

Figure 5:
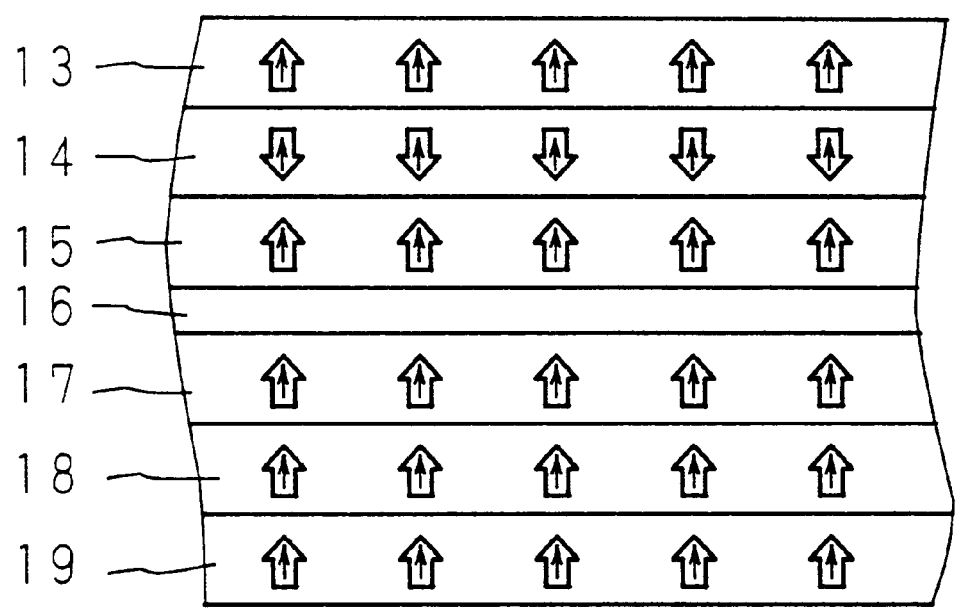
FIG. 5 shows the magnetized conditions during the initial erasure of the magneto-optic disk of the first embodiment.

The following is a description of the magnetized conditions during the erasure, recording, and reproduction of the magneto-optic disk 1 when a laser beam is emitted while an external magnetic field is being applied on the magneto-optical disk 1 having such a structure. First of all, a laser beam is emitted by using a power for erasure which makes the temperature in the irradiation area higher than the Curie temperature Tc6 of the third auxiliary layer, so as to apply an external magnetic field in the S direction (upward) for the initial erasure. FIG. 5 shows the magnetized conditions of the magneto-optic disk 1 in this step. In FIG. 5, the spin directions of the transition metal magnetization are indicated by arrows, and the directions of the actual magnetization are indicated by whitened arrows. As shown in FIG. 5, the magnetizing directions of the recording layer 15 are all upward, and the magnetizing directions of the first, second, and third auxiliary layers 17, 18, and 19 are all upward. This initial erasure step is performed only once when the disk is shipped, and not needed after shipment.

Figure 6:
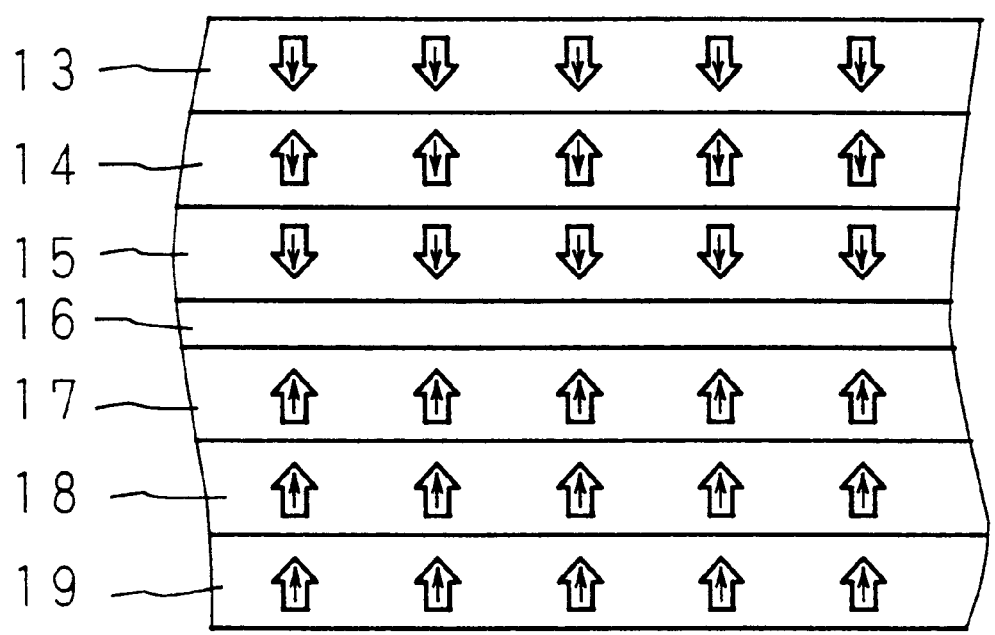
FIG. 6 shows the magnetized conditions during the erasure of the magneto-optic disk of the first embodiment.

A laser beam is emitted by using a power for erasure which makes the temperature in the irradiation area higher than the Curie temperature Tc3 of the recording layer 15 and lower than the Curie temperature Tc6 of the third auxiliary layer 19, so as to apply an external magnetic field in the N direction (downward) for the erasure to the recording layer 15. FIG. 6 shows the magnetized conditions of the magneto-optic disk 1 at this step. As shown in FIG. 6, the magnetized conditions of the reproduction layer 13, the control layer 14, and the recording layer 15 change to the reverse direction. Since the SiN intermediate layer 16 is disposed between the recording layer 15 and the auxiliary layer 17, an exchange coupled force never exists between the recording layer 15 and the auxiliary layer 17. The erasure step in the N direction is performed every time data in the magneto-optic disk are rewritten.

Figure 7:
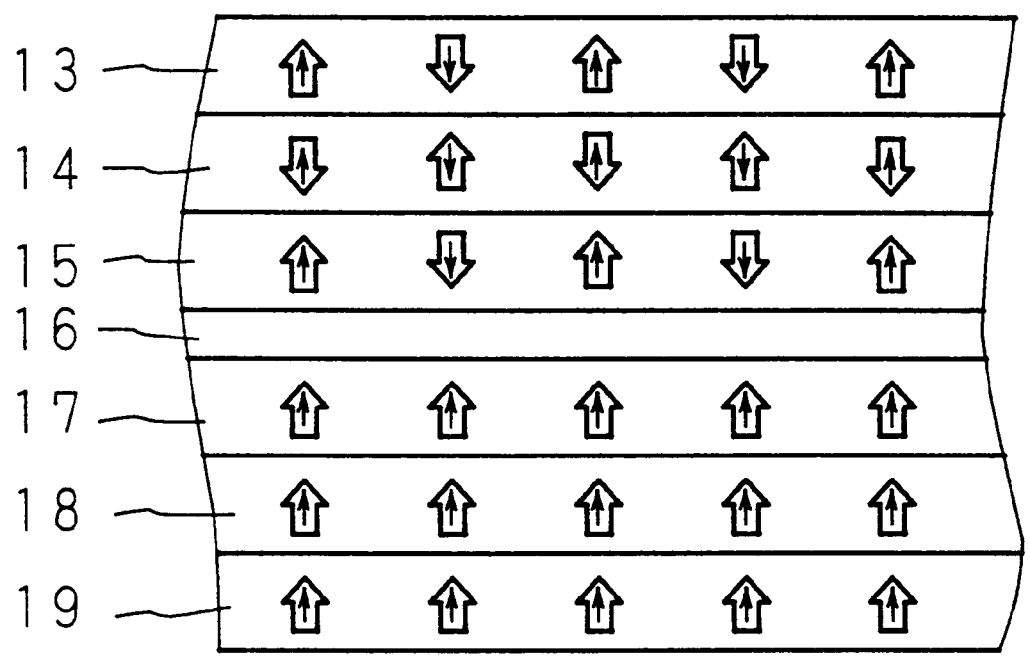
FIG. 7 shows the magnetized conditions during the recording of the magneto-optic disk of the first embodiment.

When data are recorded in the magneto-optic disk 1, a laser beam is emitted by using a power for recording which makes the temperature in the irradiation area higher than the Curie temperature Tc3 of the recording layer 15 and lower than the Curie temperature Tc6 of the third auxiliary layer 19, and by applying a recording magnetic field which is larger than the coercive force Hc3 of the recording layer 15 and smaller than the coercive force Hc6 of the third auxiliary layer, so as to perform the recording of data with the light modulation system. FIG. 7 shows the magnetized conditions of the magneto-optic disk 1 at this step. As shown in FIG. 7, the recording layer 15 has magnetizing directions according to the data and the third auxiliary layer 19 has the magnetizing directions which have been unchanged since the erasure step. This is because the recording is performed by using a power for recording which is lower than the Curie temperature Tc6 and a recording magnetic field which is smaller than the coercive force Hc6.

Figure 8:
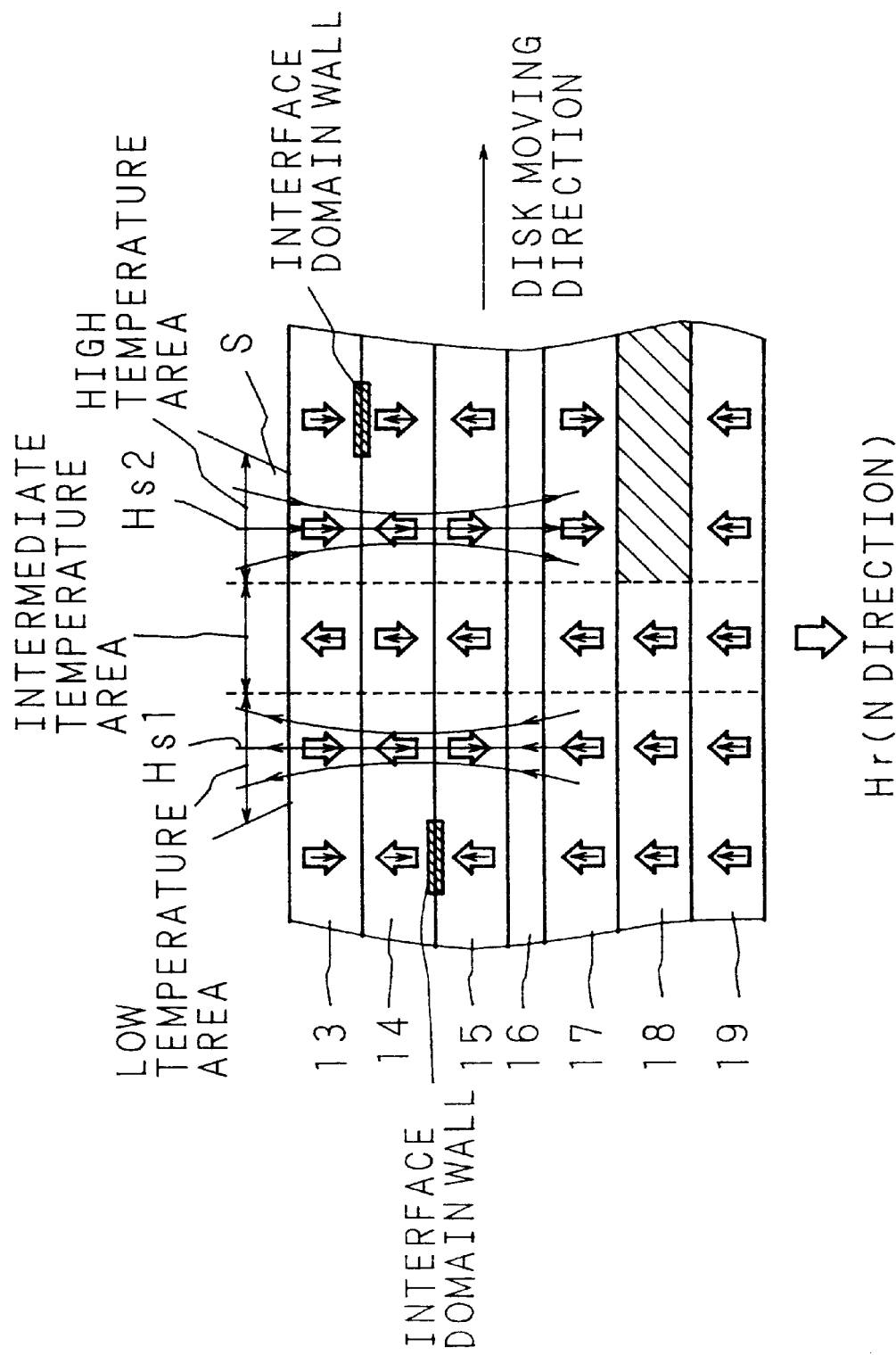
FIG. 8 shows the magnetized conditions during the reproduction of the magneto-optic disk of the first embodiment.

Thus, in order to reproduce recorded data, the laser beam is emitted by using a low power for reproduction, and a reproduction magnetic field Hr of 100 Oe is applied in the erasure direction, that is, the N direction (downwards). FIG. 8 shows the magnetized conditions of the magneto-optic disk 1 in this step. In the magneto-optic disk 1, a temperature distribution occurs within the laser spot S as mentioned above, and a low temperature area, an intermediate temperature area, and a high temperature area are formed. In the low and intermediate temperature areas, the magnetizing directions of the first auxiliary layer 17 keep their initial conditions. This is due to the exchange coupled force between the first auxiliary layer 17 and the third auxiliary layer 19 via the second auxiliary layer 18, and the exchange coupled force is far greater than that of the reproduction magnetic field Hr. The temperature of the high temperature area becomes equal to or higher than the Curie temperature Tc5, so that the second auxiliary layer 18 blocks the exchange coupled force between the first auxiliary layer 17 and the third auxiliary layer 19. As a result, the magnetizing directions of the first auxiliary layer 17 become the directions of the reproduction magnetic field Hr (N direction).

Thus, the magnetizing directions of the first auxiliary layer 17 are in the S direction at the low area and intermediate temperature area and in the N direction at the high temperature area. Consequently, a magnetostatic field Hs1 occurs at the low temperature area, and satisfies Hs1>Hr. When the exchange coupled force which acts between the control layer 14 and the recording layer 15 at the low temperature area is made Hex (23), the following relationship is satisfied:

$$Hs1>Hex(23)+Hc(12) \qquad (1)$$

Here, Hc (12) indicates the coercive force related to the reproduction layer 13 and the control layer 14. Therefore, at the low temperature area, the magnetizing directions of the control layer 14 all become the S direction due to the magnetostatic field Hs1 of the S direction, so that the magnetization of the reproduction layer 13 which has coupled-exchange with the control layer 14 always point to the N direction.

At the intermediate temperature area, too, a magnetostatic field occurs in the S direction, satisfying Hs1>Hr. However, the size difference in the formula (1) is the opposite of the low temperature area, becoming Hs1<Hex (23)+Hc (12).

As a result, the exchange coupled force becomes stronger, and the magnetizing directions of the recording layer 15 are transcribed into the reproduction layer 13.

On the other hand, at the high temperature area, the magnetizing directions of the first auxiliary layer 17 point to the N direction, and the magnetostatic field Hs2 occurs in the N direction. Since the magnetostatic field Hs2 has a smaller magnetization value than at the low temperature area, it satisfies Hs1>Hs2.

In addition,

Hr=Hs2, or Hr>Hs2 is satisfied; however, Hs2 has the same direction as the reproduction magnetic field Hr, so that a magnetic field (Hr+Hs2) in the N direction is given to the high temperature area and the magnetization of the reproduction layer 13 always points to the N direction.

Thus, when the reproduction magnetic field in the N direction is applied to reproduce data in the magneto-optic disk 1, an S-direction magnetostatic field Hs1 occurs at the low temperature area and an N-direction magnetostatic field Hs2 occurs at the high temperature area. Consequently, the magnetizing directions of the reproduction layer 13 corresponding to the front edge and the rear edge both point to the N direction, which is the erasure direction, so that both edges are given a magnetic field in the direction for reducing the jitter. As a result, the quality of the reproduction signal is improved.

Of the auxiliary magnetic layers, the first auxiliary layer 17 is a main magnetic layer for generating a reproduction magnetic field, so that the layer is made of a magnetic film having so high a Curie temperature as not to lose its magnetization at a high temperature.

Figure 9:
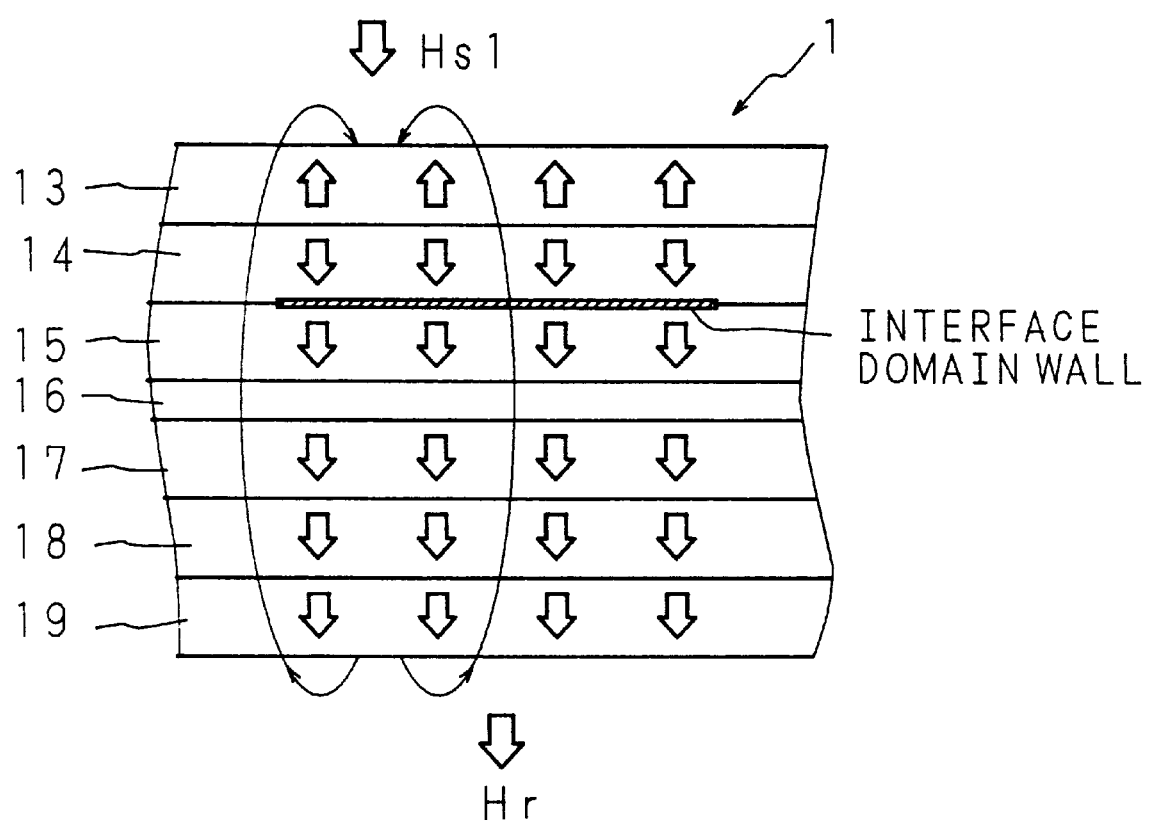
FIG. 9 shows the magnetized conditions of the magneto-optic disk when the initial erasure has been applied on the third auxiliary layer in the N direction.
Figure 10:
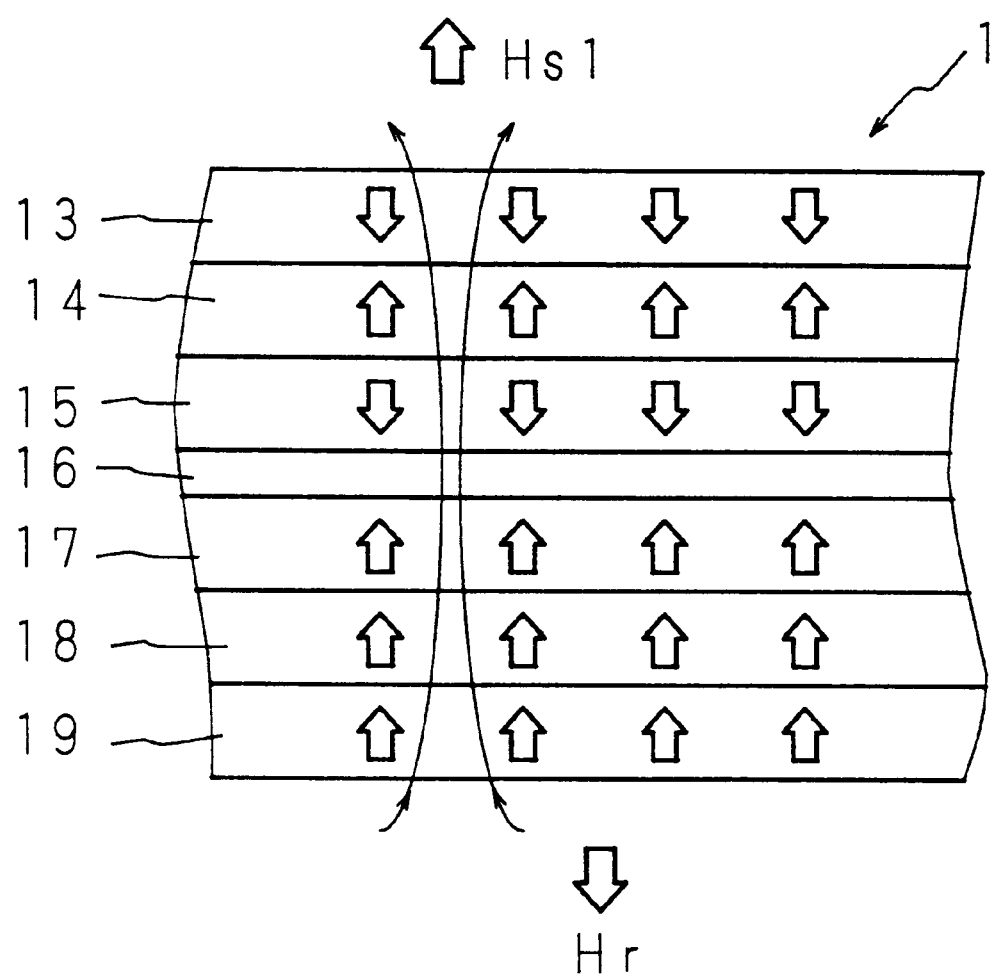
FIG. 10 shows the magnetized conditions of the magneto-optic disk when the initial erasure has been applied on the third auxiliary layer in the S direction.

The following is a description of the size of the magnetostatic field which is generated by an auxiliary magnetic layer at the low temperature area. In order to estimate the size of the magnetostatic field, an N-direction reproduction magnetic field is given to the magneto-optic disk 1 while a laser beam is being eradicated by a power for reproduction of 1 mW or below, so as to examine the changes in the levels of the reproduction signal under the same conditions as the low temperature area. FIG. 9 shows the magnetization conditions of the magneto-optic disk 1 when the initial erasure is applied to the third auxiliary layer 19 in the N direction. FIG. 10 shows the magnetization conditions of the magneto-optic disk 1 when the initial erasure is applied to the third auxiliary layer 19 in the S direction. In either case, data in the recording layer 15 are erased in the N direction. When the initial erasure is performed in the N direction (refer to FIG. 9), an N-direction magnetostatic field is generated, and as a whole, (Hr+Hs) magnetic field is applied. On the other hand, when the initial erasure is performed in the S direction (refer to FIG. 10), an S-direction magnetostatic field is generated, and as a whole, (Hr−Hs) magnetic field is applied. Here, Hr indicates the intensity of the reproduction magnetic field, and Hs indicates the intensity of the magnetostatic field generated by the first auxiliary layer 17.

Figure 11:
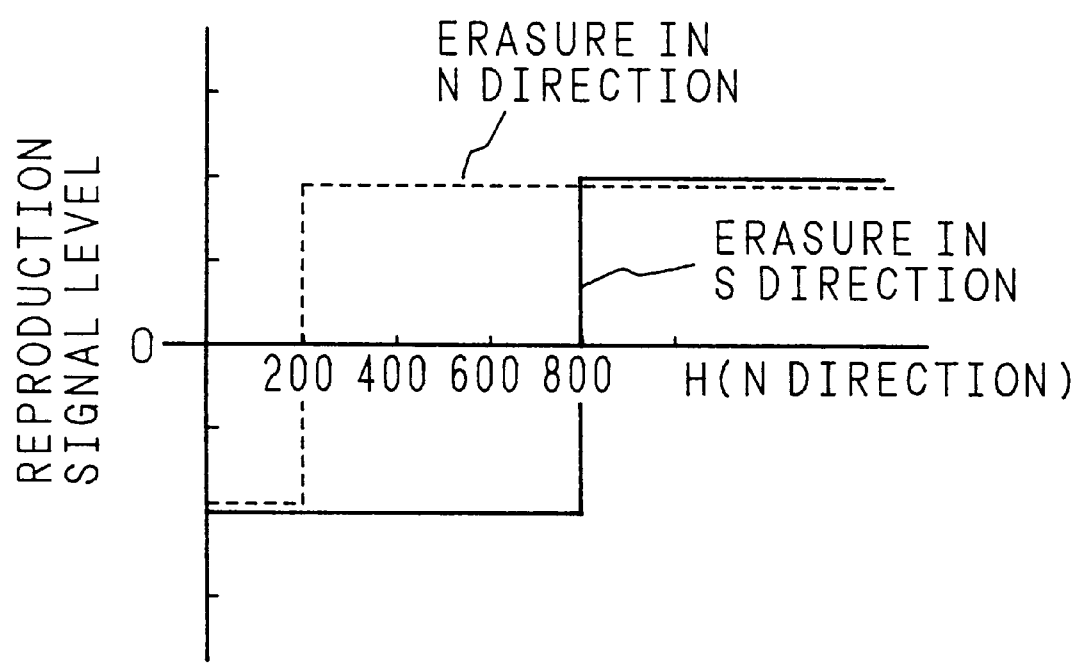
FIG. 11 shows a graph indicating the changes in the levels of the reproduction signals against the reproduction magnetic fields under the magnetized conditions shown in FIGS. 9 and 10.

FIG. 11 is a graph showing the changes in the levels of the reproduction signals of both cases, where the ordinate axis indicates the reproduction signal level and the abscissa axis indicates the intensity of the magnetic field in the N direction. When the initial erasure is performed in the S direction, the reproduction signal level is reversed at about 800 Oe, and when the initial erasure is performed in the N direction, the reproduction signal level is reversed at about 200 Oe. Consequently, the intensity of the magnetostatic field Hs corresponds to a half of the difference between (Hr+Hs) and (Hr−Hs), and in the case shown in FIG. 11, a magnetostatic field Hs of about 300 Oe occurs.

Figure 12:
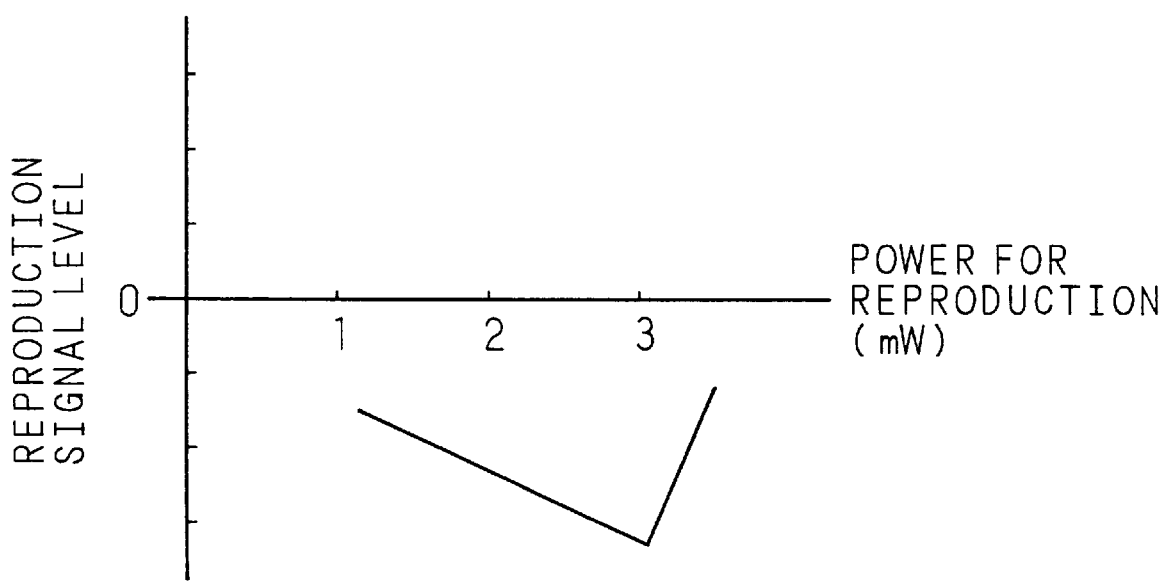
FIG. 12 shows a graph indicating the changes in the levels of the reproduction signals against the reproducing power under the magnetized conditions shown in FIG. 10.

In order to confirm the occurrence of a magnetic field at the high temperature area in the direction opposite to that at the low temperature area, a power for reproduction is increased while a magnetic field of 100 Oe is being applied in the S direction under the conditions that data on the third auxiliary layer 19 are initially erased in the S direction, and the level of the reproduction signal is measured. FIG. 12 is a graph showing the changes of the levels of the reproduction signal, and the ordinate axis indicates the reproduction signal level and the abscissa axis indicates a power for reproduction. As is known from the graph, the reproduction signal level decreases until the power for reproduction reaches 3 mW, and then begins to increase after 3 mW. This indicates that the magnetizing directions of the reproduction layer 13 change from the N direction to the S direction at the point where the power for reproduction is 3 mW. In conventional MSR media, such a change can never be observed with a laser beam of 3 mW when a magnetic field of 100 Oe is applied. This indicates that a magnetostatic field is generated at the high temperature area by the first, second, and third auxiliary layers 17, 18, 19.

Figure 13:
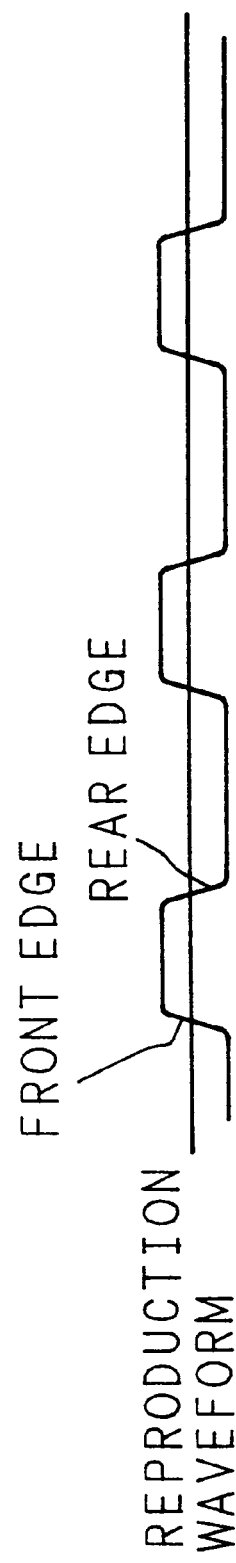
FIG. 13 shows the reproduction waveform of the magneto-optic disk of the first embodiment.

A 1.44 μm mark was recorded on the magneto-optic disk 1 having the above-mentioned structure, and a reproduction magnetic field was applied in the erasure direction (N direction) at 100 Oe. A reproduction signal was obtained at a linear velocity of 6 m/s and a reproduction waveform was confirmed. Both the front edge and the rear edge had steep inclinations. FIG. 13 shows the reproduction waveform. Thus, in the magneto-optic disk of the present embodiment, the inclinations of both the edges of the reproduction waveform are close to be symmetrical, which means that a highly qualified reproduction signal can be obtained. In addition, since a magnetic field for reproduction is generated, it becomes possible to reduce the intensity of a magnetic field to be applied from outside.

SECOND EMBODIMENT

As a second embodiment of the present invention, a magneto-optic disk 2 which uses a RE-rich rare-earth transition metal alloy film (GdFeCo film) as the first auxiliary layer 27 will be described. The Curie temperature Tc4 of the first auxiliary layer 27 is about 340° C., and its compensation temperature is 200° C. Since the film structure and the film forming process are the same as those in the first embodiment, their description will be omitted.

Figure 14:
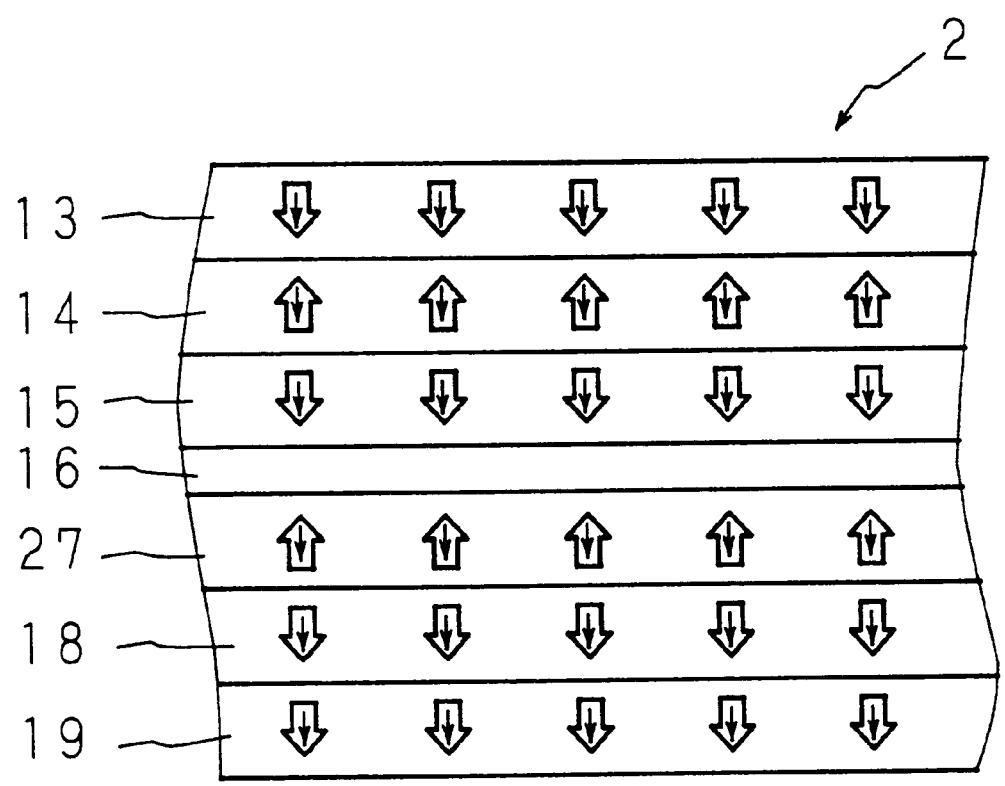
FIG. 14 shows the magnetized conditions during the initial erasure of the magneto-optic disk of the second embodiment.

The following is a description of the magnetized conditions during the erasure, recording, and reproduction of the magneto-optic disk 2 when a laser beam is emitted while an external magnetic field is being applied. First of all, a laser beam is emitted by using a power for erasure which makes the temperature in the irradiation area higher than the Curie temperature Tc6 of the third auxiliary layer, so as to apply an external magnetic field in the N direction (downward) for the initial erasure. FIG. 14 shows the magnetized conditions of the magneto-optic disk 2 in this step. As shown in FIG. 14, the magnetizing directions of the recording layer 15 are all downward, the magnetizing directions of the first auxiliary layer 17 are all upward, and the magnetizing directions of the second and third auxiliary layers 18 and 19 are all downward. This initial erasure is performed only once when the disk is shipped.

A laser beam is emitted by using a power for erasure which makes the temperature higher than the Curie temperature Tc3 of the recording layer 15 and lower than the Curie temperature Tc6 of the third auxiliary layer 19, so as to apply an external magnetic field in the N direction (downward) for the erasure of the recording layer 15. This erasure is performed every time data in the magneto-optic disk 2 are rewritten.

Figure 15:
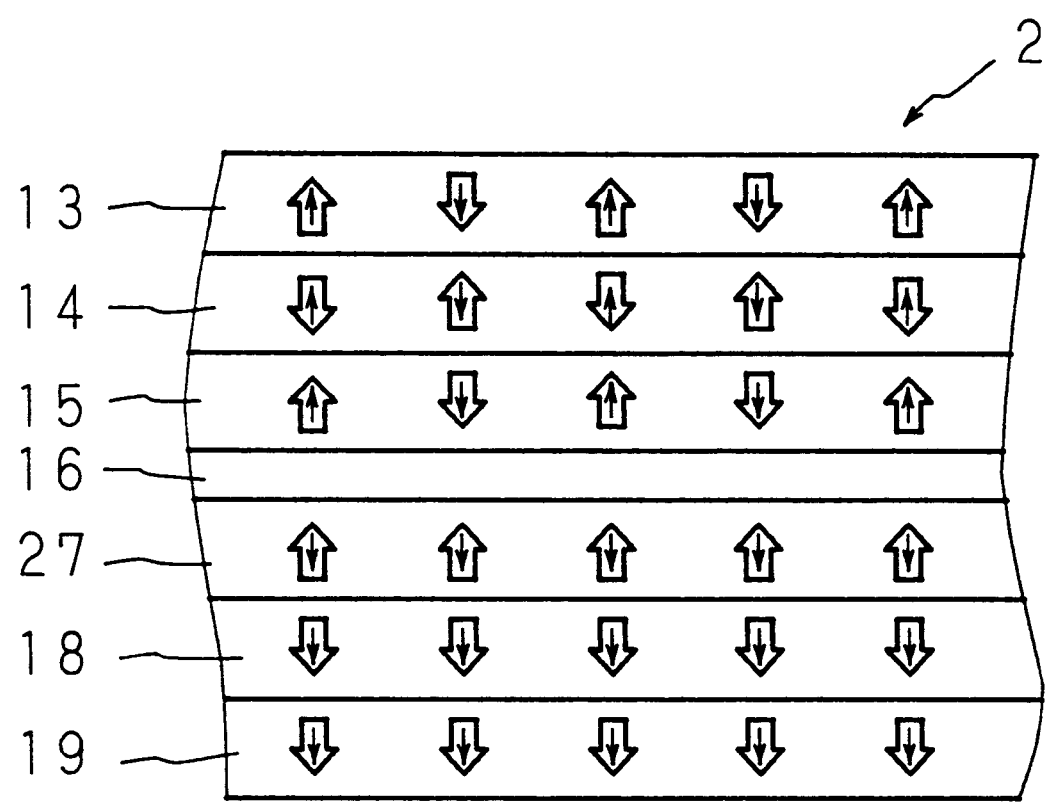
FIG. 15 shows the magnetized conditions during the recording of the magneto-optic disk of the second embodiment.

When data are recorded in the magneto-optic disk 2, a laser beam is emitted by using a power for recording which makes the temperature in the irradiation area higher than the Curie temperature Tc3 of the recording layer 15 and lower than the Curie temperature Tc6 of the third auxiliary layer 19, and by applying an external magnetic field which is larger than the coercive force Hc3 of the recording layer 15 and smaller than the coercive force Hc6 of the third auxiliary layer 19, so as to perform the recording of data with the light modulation system. FIG. 15 shows the magnetized conditions of the magneto-optic disk 2 in this moment. As shown in FIG. 15, the recording layer 15 has magnetizing directions according to the data, and the third auxiliary layer 19 has the magnetizing directions which have been unchanged since the erasure step. This is because the recording is performed by using a power for recording which is lower than the Curie temperature Tc6 and a magnetic field which is smaller than the coercive force Hc3.

Figure 16:
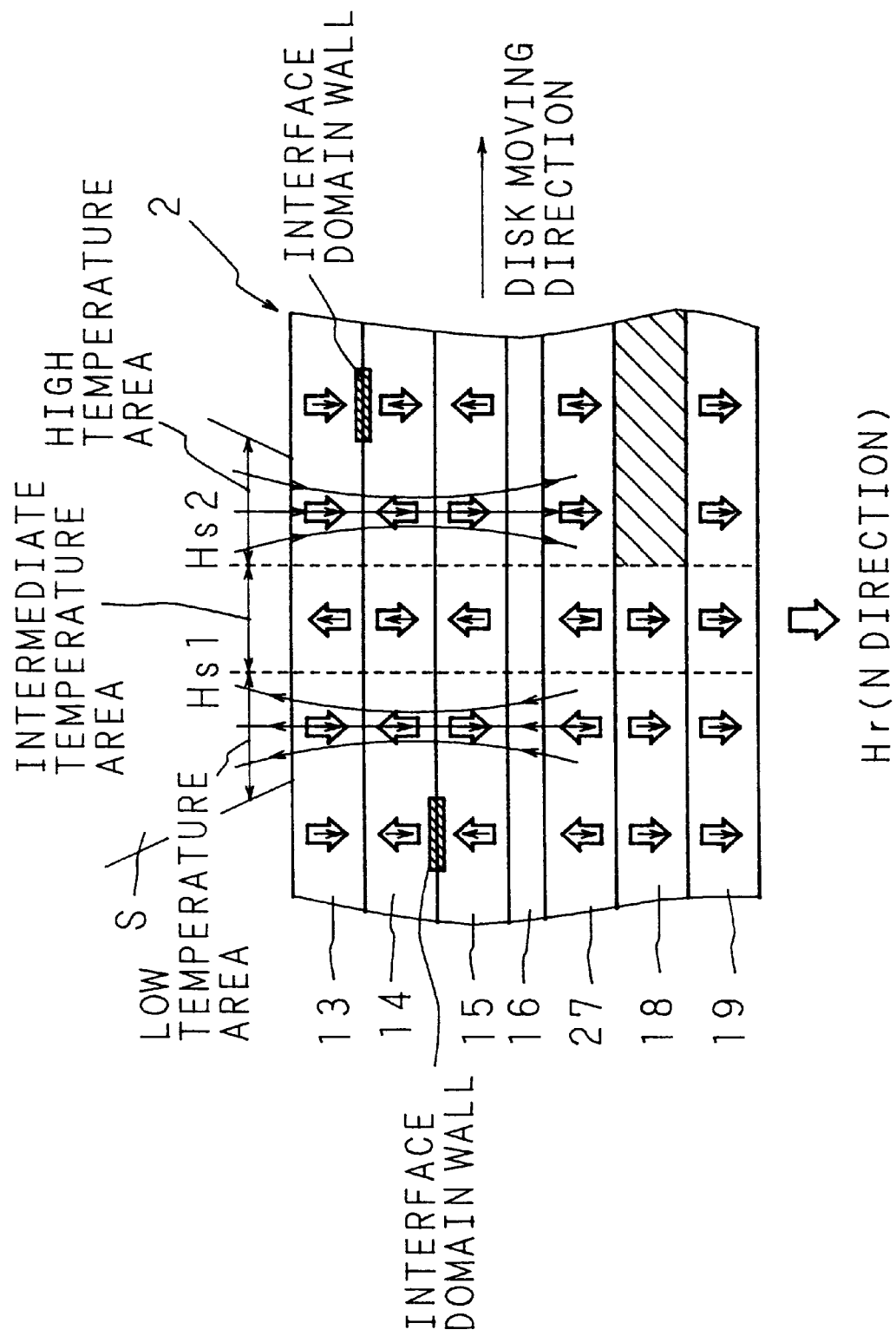
FIG. 16 shows the magnetized conditions during the reproduction of the magneto-optic disk of the second embodiment.

Thus, in order to reproduce recorded data, the laser beam is emitted by using a low power for reproduction, and a reproduction magnetic field Hr of 100 Oe is applied in the erasure direction, that is, the N direction (downwards). FIG. 16 shows the magnetized conditions of the magneto-optic disk 1 in this step. In the magneto-optic disk 2, a temperature distribution occurs within the laser spot S as mentioned above, and a low temperature area, an intermediate temperature area, and a high temperature area are formed. In the low and intermediate temperature areas, the magnetizing directions of the first auxiliary layer 27 keep their initial conditions. This is due to the exchange coupled force between the first auxiliary layer 27 and the third auxiliary layer 19 via the second auxiliary layer 18, and the exchange coupled force is far greater than that of the reproduction magnetic field Hr. The temperature of the high temperature area becomes equal to or higher than the Curie temperature Tc5, so that the second auxiliary layer 18 blocks the exchange coupled force between the first auxiliary layer 27 and the third auxiliary layer 19. As a result, the magnetizing directions of the first auxiliary layer 27 become the directions of the reproduction magnetic field Hr (N direction). Of the auxiliary magnetic layers, the first auxiliary layer 27 is a main magnetic layer for generating a reproduction magnetic field, so that the layer is made of a magnetic film having so high a Curie temperature as not to lose its magnetization at a high temperature.

Figure 17:
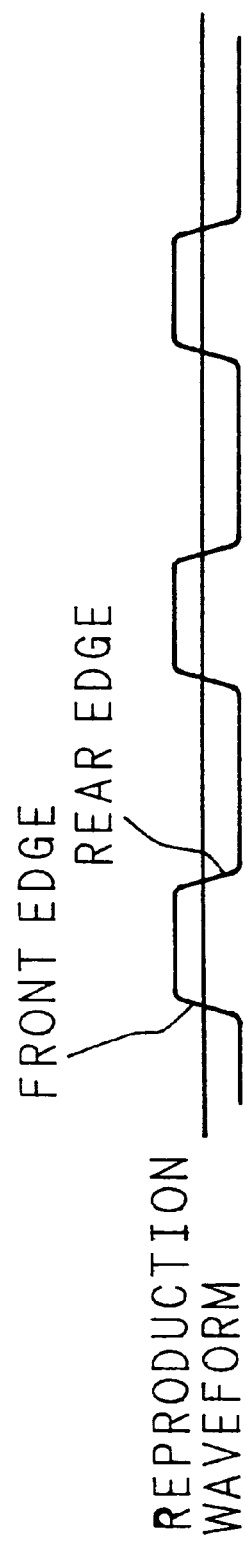
FIG. 17 shows the reproduction waveform of the magneto-optic disk of the second embodiment.

In the same manner as in the first embodiment, such a magnetization of the first auxiliary layer 27 makes an S-direction magnetostatic field Hsl occur at the low temperature area and an N-direction magnetostatic field Hs2 occur at the high temperature area. Consequently, the magnetizing directions of the reproduction layer 13 corresponding to the front edge and the rear edge both point to the N direction, which is the erasure direction, so that both edges are given a magnetic field in the direction for reducing the jitter. A 1.44 μm mark was recorded on the magneto-optic disk 2 having the above-mentioned structure, and a reproduction magnetic field was applied in the erasure direction (N direction) at 100 Oe. A reproduction signal was obtained at a linear velocity of 6 m/s and a reproduction waveform was confirmed. Both the front edge and the rear edge had steep inclinations. FIG. 17 shows the reproduction waveform. Thus, in the magneto-optic disk of the present embodiment, the inclinations of both the edges of the reproduction waveform are steep and close to be symmetrical, which means that a highly qualified reproduction signal can be obtained.

In addition, according to the magneto-optic disk 2, the magnetization direction of the first auxiliary layer 27 is the same as that of the third auxiliary layer 19 at the high temperature area, and less affected by the magnetostatic field from the third auxiliary layer 19 as compared with the first embodiment which indicates the opposite direction, so that it is advantageous to the generation of the magnetostatic field Hs2. Consequently, the intensity of the external magnetic field can be further reduced than in the first embodiment.

In the above-mentioned embodiments, the SiN intermediate layer 16 is disposed between the recording layer 15 and the first auxiliary layer 17. However, the intermediate layer is not restricted to SiN and can be a nitride film such as SiN, AlN, and TiN, an oxidized film such as $SiO_2$, $TiO_2$, and $Y_2O_3$, or a non-magnetic film such as Al and Cu.

As explained hereinbefore, according to the present invention, magnetic field generation layers which generate simultaneously two magnetic fields having reverse polarities to each other are provided so as to give each magnetic field to the area before and after the transcription area of the recorded mark. Consequently, it becomes possible to give a magnetic field having an advantageous polarity to each of the front and rear edges of the reproduction waveform, so that the inclinations of the front and rear edges become steep and closer to being symmetrical. As a result, the present invention has excellent effects including the enhancement of the quality of the reproduction signal.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| Deposited layer | Composition | Film thickness (nm) | Dominant | Curie temperature (° C.) | Coercive force (Oe) |
| --- | --- | --- | --- | --- | --- |
| SiN foundation layer | SiN | 70 | — | — | — |
| Reproduction layer | GdFeCo | 35 | TM-rich | 300 | 300 |
| Control layer | GdFe | 35 | RE-rich | 170 | <10 |
| Recording layer | TbFeCo | 40 | TM-rich | 270 | 12000 |
| SiN intermediate layer | SiN | 5 | — | — | — |
| First auxiliary layer | GdFeCo | 30 | TM-rich | 350 | 200 |

TABLE 1-continued

| Deposited layer | Composition | Film thickness (nm) | Dominant | Curie temperature (° C.) | Coercive force (Oe) |
| --- | --- | --- | --- | --- | --- |
| Second auxiliary layer | TbFe | 10 | TM-rich | 150 | 5000 |
| Third auxiliary layer | TbFeCo | 20 | TM-rich | 380 | 15000 |
| SiN protection layer | SiN | 60 | — | — | — |

What is claimed is:

1. A magneto-optical recording medium comprising:
   a magnetic layer for recording and reproducing data; and
   a magnetic field generation layer for generating simultaneously two magnetic fields having reverse polarities in different areas, said magnetic field generation layer being formed by a magnetic film and situated at one surface of said magnetic layer.

2. A magneto-optical recording medium comprising:
   first, second, and third magnetic layers for recording and reproducing data for generating a temperature distribution in said magnet-optic recording medium due to an irradiation of a light beam which relatively moves with said first, second, and third magnetic layers and for reading data from an area determined by the temperature distribution in said magnet-optic recording medium; and
   a magnetic field generation layer for generating simultaneously two magnetic fields having reverse polarities in different areas, said magnetic field generation layer being formed by a magnetic film and situated at an opposite side of said third magnetic layer to said second magnetic layer.

3. A magneto-optical recording medium comprising:
   first, second, and third magnetic layers for recording and reproducing data for being made from a rare-earth/transition-metal alloy, said first and third magnetic layers having characteristics of easy magnetization in a direction of layer deposition and said second magnetic layer being rare-earth magnetization dominant and having characteristics of easy magnetization in an in-plane direction at room temperature; and
   a magnetic field generation layer for generating simultaneously two magnetic fields having reverse polarities in different areas, said magnetic field generation layer being formed by a magnetic film and situated at an opposite side of said third magnetic layer to said second magnetic layer.

4. The magneto-optical recording medium according to claim 1 further comprising a non-magnetic layer between said magnetic layer and said magnetic field generation layer, and wherein said magnetic field generation layer includes a plurality of magnetic layers which have magnetically exchange coupled force at room temperature.

5. The magneto-optical recording medium according to claim 3 further comprising a non-magnetic layer between said magnetic layers and said magnetic field generation layer, and wherein said magnetic field generation layer includes a plurality of magnetic layers which have magnetically exchange coupled force at room temperature.

6. The magneto-optic recording medium according to claim 3, wherein said magnetic field generation layer includes fourth, fifth, and sixth magnetic layers from a side closer to said third magnetic layer, and wherein coercive forces Hc1 to Hc6 of said first to sixth magnetic layers, respectively, and Curie temperatures Tc1 to Tc6 of said first to sixth magnetic layers, respectively, satisfy following relations:

Hc6>Hc3>Hc5>Hc1,

Hc4>Hc2,

Tc6>Tc4>Tc1>Tc3>Tc2>Tc5.

7. The magneto-optic recording medium according to claim 3, wherein said magnetic field generation layer includes a magnetic layer formed by a transition metal magnetization dominant rare-earth/transition-metal alloy film.

8. The magneto-optic recording medium according to claim 3, wherein said magnetic field generation layer includes a magnetic layer formed by a rare-earth metal magnetization dominant rare-earth/transition-metal alloy film.

9. The magneto-optic recording medium according to claim 5, wherein said magnetic field generation layer includes fourth, fifth, and sixth magnetic layers from a side closer to said third magnetic layer, and wherein coercive forces Hc1 to Hc6 of said first to sixth magnetic layers, respectively, and Curie temperatures Tc1 to Tc6 of said first to sixth magnetic layers, respectively, satisfy following relations:

Hc6>Hc3>Hc5>Hc1,

Hc4>Hc2,

Tc6>Tc4>Tc1>Tc3>Tc2>Tc5.

10. The magneto-optic recording medium according to claim 5, wherein said magnetic field generation layer includes a magnetic layer formed by a transition metal magnetization dominant rare-earth/transition-metal alloy film.

11. The magneto-optic recording medium according to claim 5, wherein said magnetic field generation layer includes a magnetic layer formed by a rare-earth metal magnetization dominant rare-earth/transition-metal alloy film.

12. The magneto-optic recording medium according to claim 6, wherein said fourth magnetic layer is formed by a transition metal magnetization dominant rare-earth/transition-metal alloy film.

13. The magneto-optic recording medium according to claim 6, wherein said fourth magnetic layer is formed by a rare-earth metal magnetization dominant rare-earth/transition-metal alloy film.

14. The magneto-optic recording medium according to claim 9, wherein said fourth magnetic layer is formed by a transition metal magnetization dominant rare-earth/transition-metal alloy film.

15. The magneto-optic recording medium according to claim 9, wherein said fourth magnetic layer is formed by a rare-earth metal magnetization dominant rare-earth/transition-metal alloy film.

* * * * *